United States Patent
Suekawa et al.

(10) Patent No.: US 7,184,270 B2
(45) Date of Patent: Feb. 27, 2007

(54) TOOLLESS PRINTED CIRCUIT CARRIER ASSEMBLY

(75) Inventors: Michael Y. Suekawa, San Jose, CA (US); Kwang H. Kim, Santa Clara, CA (US); Gwynn M. Masada, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 146 days.

(21) Appl. No.: 10/721,627

(22) Filed: Nov. 25, 2003

(65) Prior Publication Data

US 2005/0111198 A1    May 26, 2005

(51) Int. Cl.
*H05K 5/00* (2006.01)
*H01R 13/62* (2006.01)

(52) U.S. Cl. ...................... 361/724; 439/325

(58) Field of Classification Search ........ 361/724–727, 361/683, 686, 752, 756, 759, 801, 802, 796; 439/324–326, 61, 66, 71–73, 91, 591, 331
See application file for complete search history.

(56) References Cited

U.S. PATENT DOCUMENTS

| | | | | |
|---|---|---|---|---|
| 5,192,228 A * | 3/1993 | Collins et al. .............. 439/567 |
| 5,713,744 A * | 2/1998 | Laub ........................... 439/71 |
| 6,126,472 A * | 10/2000 | Choy .......................... 439/328 |
| 6,141,222 A | 10/2000 | Tour et al. |
| 6,238,025 B1 | 5/2001 | Kern et al. |
| 6,333,932 B1 * | 12/2001 | Kobayasi et al. ........... 370/389 |
| 6,578,101 B1 * | 6/2003 | Ahern ......................... 710/306 |
| 6,592,088 B2 | 7/2003 | Thompson |
| 6,595,605 B1 | 7/2003 | Babcock et al. |
| 6,731,741 B1 * | 5/2004 | Fourcand et al. ...... 379/221.08 |
| 6,831,840 B2 * | 12/2004 | Ruff ............................ 361/759 |
| 6,885,566 B2 * | 4/2005 | Chen .......................... 361/802 |
| 6,975,629 B2 * | 12/2005 | Welin ......................... 370/392 |
| 2005/0117249 A1 * | 6/2005 | Spychalla ................ 360/98.04 |

* cited by examiner

*Primary Examiner*—Dean A. Reichard
*Assistant Examiner*—Hung Nguyen

(57) ABSTRACT

A printed circuit assembly carrier comprises a carrier frame configured to hold a selected printed circuit assembly of at least two different printed circuit assemblies in at least two different orientations, a first toolless retention feature coupled to a first surface of the carrier frame and configured to retain the selected printed circuit assembly, and a second toolless retention feature coupled to a second surface of the carrier frame and configured to secure the carrier frame in at least one of the orientations.

18 Claims, 10 Drawing Sheets

TOOLLESS PRINTED CIRCUIT CARRIER ASSEMBLY

BACKGROUND OF THE INVENTION

Information storage devices are fundamental building blocks in computing, communications, and data storage. A common information storage device is a hard disk drive, or hard drive, that can generally store large data quantities and enable fast read and write access to stored data. A hard drive stores data on one or more magnetic storage platters that are rotated by a spindle motor using multiple read/write heads. Signals read or written by the head are amplified by one or more preamplifiers. Hard drive internal components are encased in a housing assembly with a cover, and are sealed tightly in a clean room environment. The drive also contains a printed circuit assembly (PCA). The printed circuit assembly houses drive electronics that enable the hard drive to communicate with a processor or controller, and enables synchronous operation of the hard drive components. PCA electronics commonly include a microprocessor that controls drive functions, interface electronics for communicating with the processor's interface bus, a controller application-specific integrated circuit (ASIC) that operates all controller hardware for the drive, a read channel to encode and decode data, and a motor ASIC to drive the motor and actuator coil.

As technology progresses, hard drives have increased density even while storing larger data quantities at greater access speed. The increased density of hard drives, and in electronic devices in general, has made assembly and maintenance more difficult. The difficulty of handling and accessing tiny components and devices can increase the time for production and servicing, thereby increasing costs. A particular challenge is the handling and manipulation of tiny hardware, such as screws, that are used to secure parts of electronic devices. Manipulation of tools to engage the hardware increases time and costs of production and maintenance, whether tasks are performed manually or robotically.

SUMMARY

What are desired are structures and components, and associated operating methods, that enable toolless service, and maintenance of electronic devices.

According to an embodiment of the disclosed apparatus, a printed circuit assembly carrier comprises a carrier frame configured to hold a selected printed circuit assembly of at least two different printed circuit assemblies in at least two different orientations, a first toolless retention feature coupled to a first surface of the carrier frame and configured to retain the first printed circuit assembly, and a second toolless retention feature coupled to a second surface of the carrier frame configured to retain the second printed circuit assembly in at least one of the orientations.

In accordance with other embodiments, an electronic device assembly comprises a housing, first and second printed circuit assemblies of respective first and second types capable of coupling to the housing, and a plurality of identical printed circuit assembly carriers capable of coupling the first and second printed circuit assemblies to the housing. The carriers couple the printed circuit assemblies of different types to the housing in different orientations via toolless retention features.

In accordance with additional embodiments, a method of assembling and/or configuring a hard disk drive comprises providing a carrier that can hold at least two different printed circuit assemblies in at least two different configurations with respect to a housing, and coupling a first printed circuit assembly to the housing using the carrier, the first printed circuit assembly being coupled to the housing via toolless retention in a first orientation.

In accordance with other embodiments, a printed circuit assembly carrier comprises means for holding a printed circuit assembly capable of holding a plurality of different printed circuit assemblies in a plurality of different orientations, and means for retaining the first printed circuit assembly using toolless retention.

BRIEF DESCRIPTION OF THE DRAWINGS

Embodiments of the invention relating to both structure and method of operation, may best be understood by referring to the following description and accompanying drawings.

DETAILED DESCRIPTION

Figure 2A:
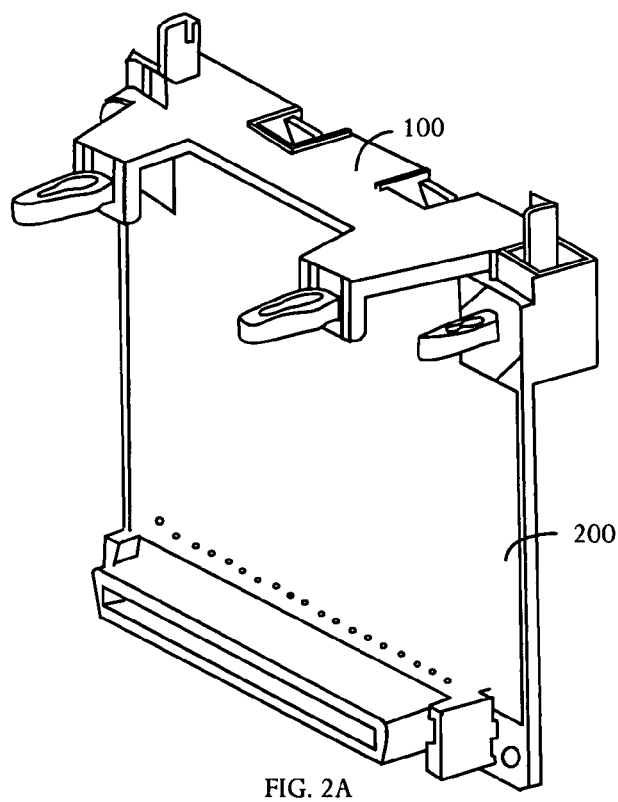
FIGS. 2A and 2B are perspective pictorial views showing examples of the illustrative PCA carrier embodiment installed on different types of printed circuit assemblies that are arranged in different orientations.
Figure 2B:
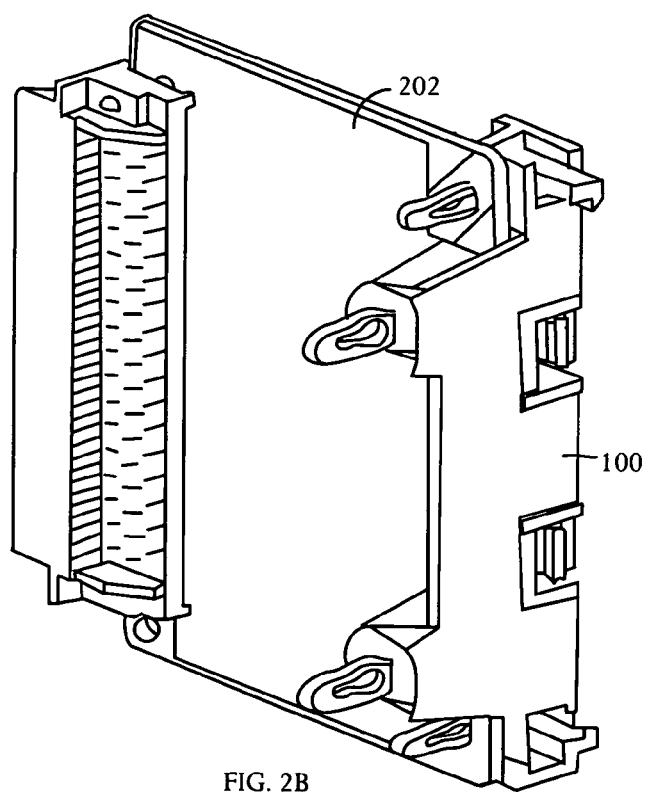

A carrier 100 is configured to hold multiple printed circuit assemblies in multiple different orientations to support operability of one or more electronic devices configured for multiple uses. In a particular embodiment, the carrier 100 is used to support manageability of hard disk drives configured for simplex or duplex modes as shown in FIGS. 2A and 2B.

Figure 1A:
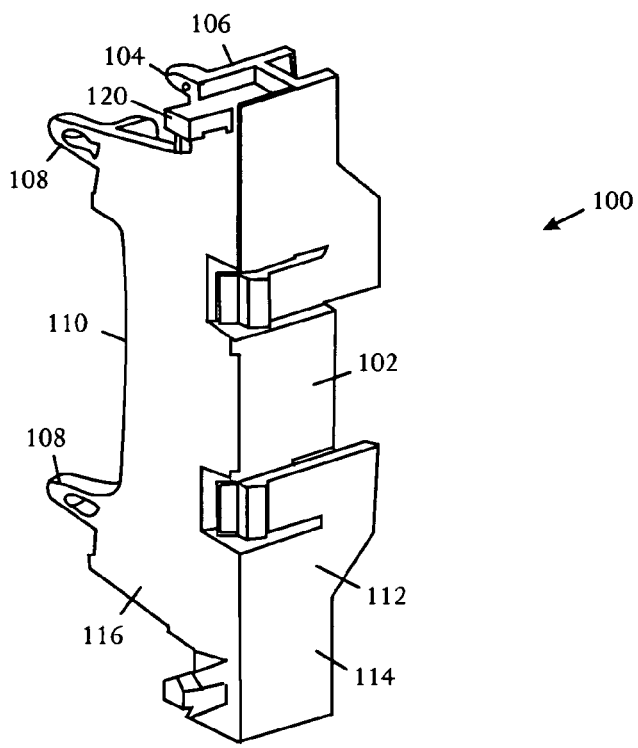
FIGS. 1A and 1B are perspective rear and front views illustrating an embodiment of a printed circuit assembly (PCA) carrier.
Figure 3A:
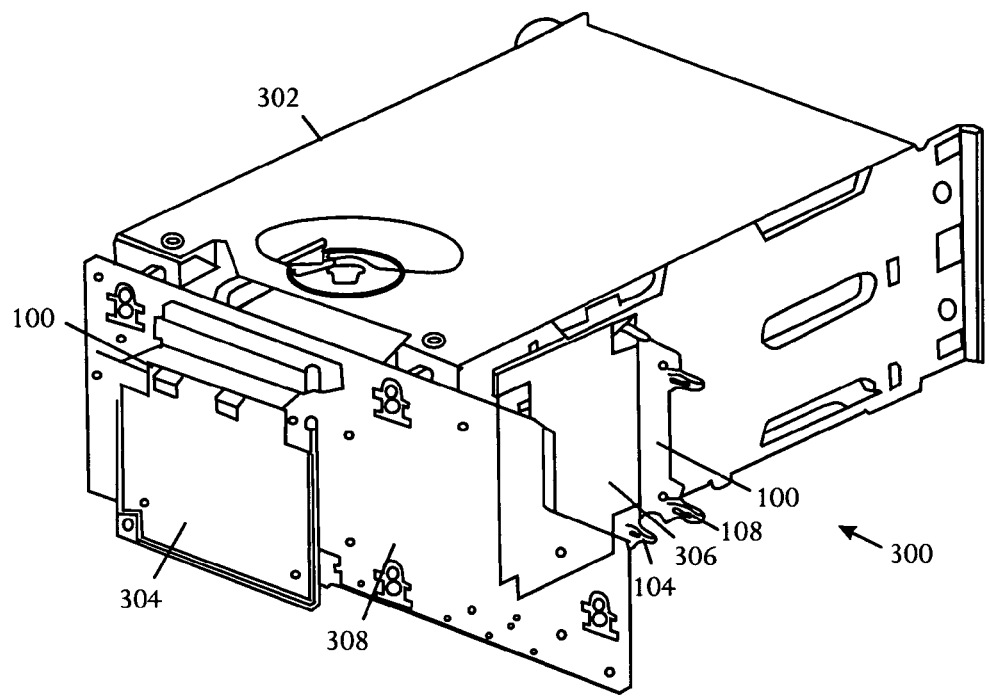
FIGS. 3A through 3F are perspective pictorial diagrams that depict various different views of an embodiment of a hard disk drive assembly.

For example, the carrier 100 enables toolless installation of a manageability printed circuit assembly 304 into the carrier 100 and toolless installation to the rear of a hard disk drive printed circuit assembly 308 as shown in FIG. 3A. The carrier 100 can also supply a cable connector retention feature 120, for example for usage in securing a small computer systems interface (SCSI) cable connection. In the illustrative embodiment, the cable is separate from the connector as shown in FIG. 1A.

Figure 1B:
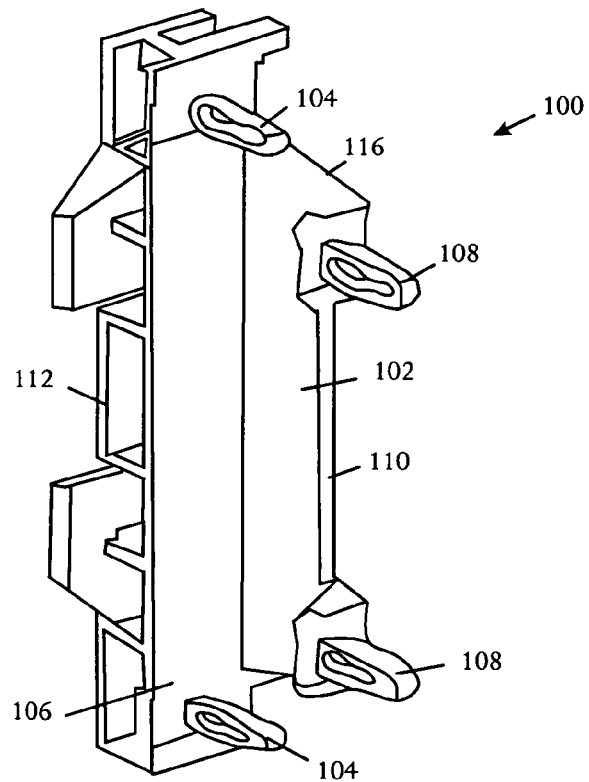
Figure 3E:
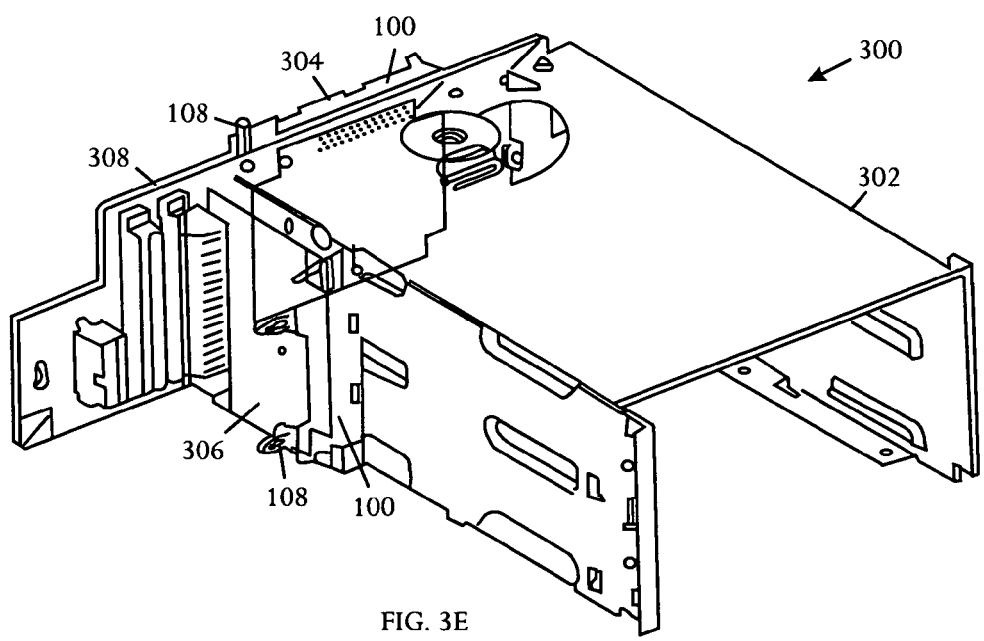
Figure 3B:
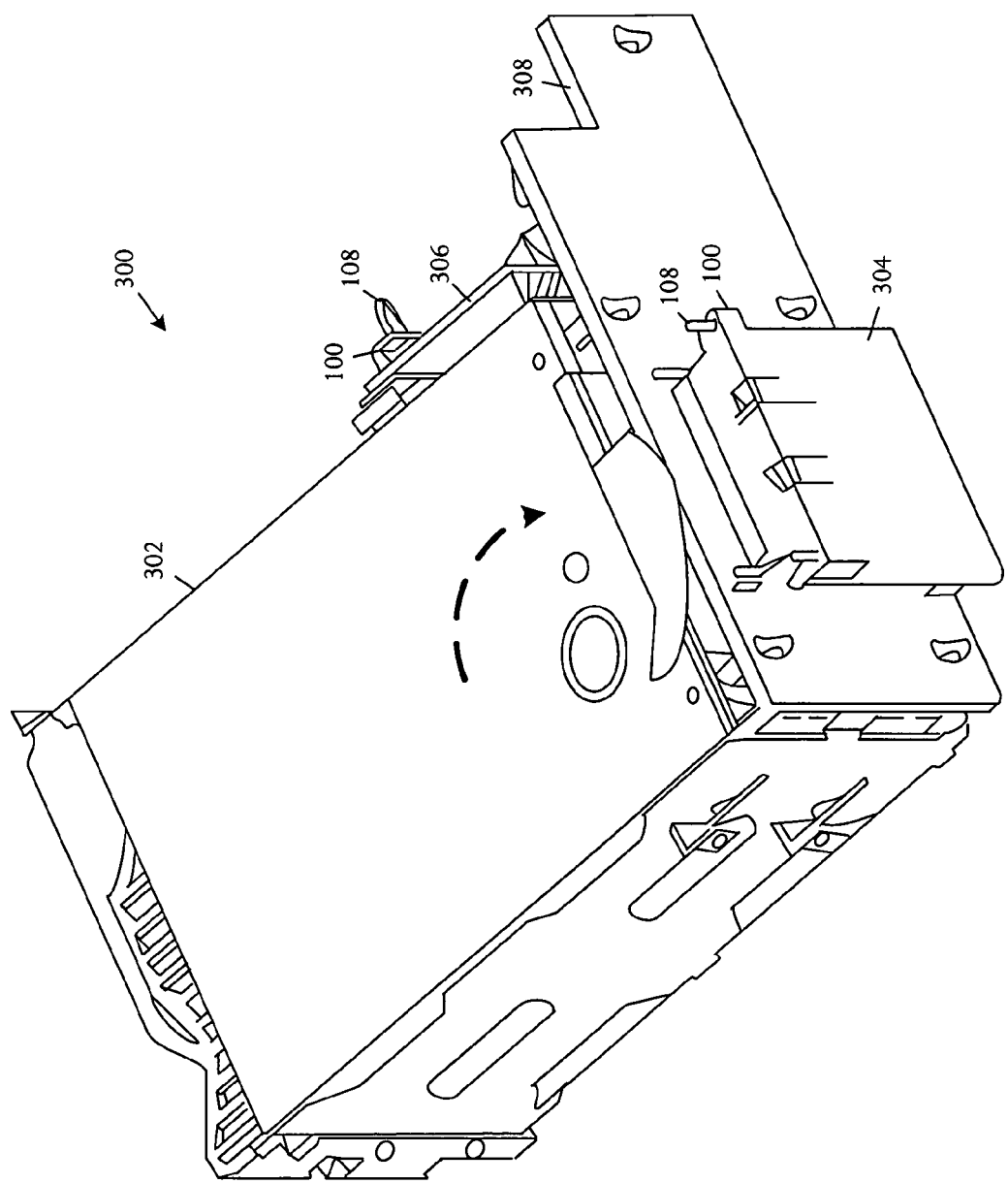

For system configuration in a duplex mode, the carrier 100 is installed on the side of the main hard disk drive printed circuit assembly 308 as shown in FIG. 3B with a duplex printed circuit assembly 306. The duplex printed circuit assembly 306 snaps into the same features as the management printed circuit assembly 304 as shown in FIG. 1B and the carrier 100 can be installed without using tools on the side of the hard disk drive housing or cage 302. In the illustrative configuration, the carrier 100 also prevents the duplex printed circuit assembly 306 from physically contacting sheet metal of the hard disk drive cage 302, possibly resulting in electrical short-circuiting or damage to the printed circuit assembly 304, 306, and/or 308.

The illustrative carrier 100 and design configuration of an electronic device 300 enables a single part, for example a plastic part, to be molded, configured, and applied to support multiple different printed circuit assemblies installed in different orientations. The carrier 100 is toolless and therefore does not require screws or other fasteners for installation of a printed circuit assembly into the carrier 100 or when the carrier assembly is installed into an electronic device or system. The carrier 100 can also include a cable connector retention feature 120, for example for usage in the management printed circuit assembly configuration to prevent cable connections, such as SCSI cable connections, from loosening or separating during reliability testing and after transportation to customer sites.

The illustrative carrier 100 and design configuration enables multiple different printed circuit assemblies to be installed into a space-constrained area within an electronic device or system, and includes features, such as cable retention features 120, that facilitate passing of qualification testing and improve user interfacing for installation and removal of the printed circuit assemblies within the system.

The carrier 100 and design configuration enable disassembly of the carrier 100 from a printed circuit assembly to support a capability for recycling and to address environmental concerns and regulations.

The capability for toolless connection in an electronic device eliminates usage of screws or other hardware, thereby reducing the number of components to be managed, installed, and maintained. The illustrative carrier 100 and design configuration also eliminates usage of retention features on cable connectors that would otherwise increase the amount of physical space consumed within an area that is typically highly constrained.

Referring to FIGS. 1A and 1B, perspective rear and front views show an embodiment of a printed circuit assembly (PCA) carrier 100. The PCA carrier 100 comprises a carrier frame 102 that is configured to hold a selected printed circuit assembly of at least two different printed circuit assemblies in at least two different orientations. A first toolless retention feature 104 is coupled to a first surface 106 of the carrier frame 102 and is configured to retain the selected printed circuit assembly. A second toolless retention feature 108 is coupled to a second surface 110 of the carrier frame 102 and is configured to secure the carrier frame 102 in at least one of the orientations.

In the illustrative PCA carrier 100, the carrier frame 102 is constructed from molded plastic material, for example polycarbonate, and the first 104 and second 108 toolless retention features are plastic snap features that are molded onto and extend from the frame 102. A specific plastic material that can be used in polycarbonate, GE Lexan HF1110, Color 701 Black, from GE Plastics of Pittsfield, Mass. Many other materials may be appropriate.

In some embodiments, the carrier frame 102 comprises a first member 112 having parallel opposing planar surfaces including an interior planar surface 106 and an exterior planar surface 114. The interior planar surface 106 is shown as the surface coupled to the first toolless retention feature 104. The interior planar surface 106 is configured to receive and retain the selected printed circuit assembly. The illustrative carrier frame 102 also comprises a second member 116 coupled at an end of the first member 112 at an angle that is substantially perpendicular to the first member 112. The substantially perpendicular angle between the first 112 and second 116 members can have a wide range of variability and is configured to assist in securing a printed circuit assembly within the carrier 100 and to enable placement and location of the carrier 100 and secured printed circuit assembly in the plurality of possible orientations. A substantially perpendicular angle between first 112 and second 116 members enables carriers 100 to secure different printed circuit assemblies in perpendicular orientations.

In the illustrative embodiment, the second member 116 extends beyond the interior planar surface 106 to the second surface 110 that couples to the second toolless retention feature 108.

In some embodiments, the PCA carrier 100 further comprises a cable retention feature 120 coupled to the carrier frame 102. The cable retention feature 120 is used to secure one or more cables that connect devices in a system. In the illustrative example, the cable retention feature 120 is a plastic extrusion or other feature molded onto the carrier frame 102.

Referring to FIGS. 2A and 2B are perspective pictorial views showing examples of the illustrative PCA carrier embodiment 100 installed on respective first 200 and second 202 types of printed circuit assemblies that are arranged in two different orientations. In the illustrative embodiment, the first printed circuit assembly 200 is a management printed circuit assembly for usage with a hard disk drive printed circuit assembly in either simplex or duplex configurations. The second printed circuit assembly 202 is a duplex printed circuit assembly for usage with the hard disk drive printed circuit assembly in the duplex configuration.

Figure 3C:
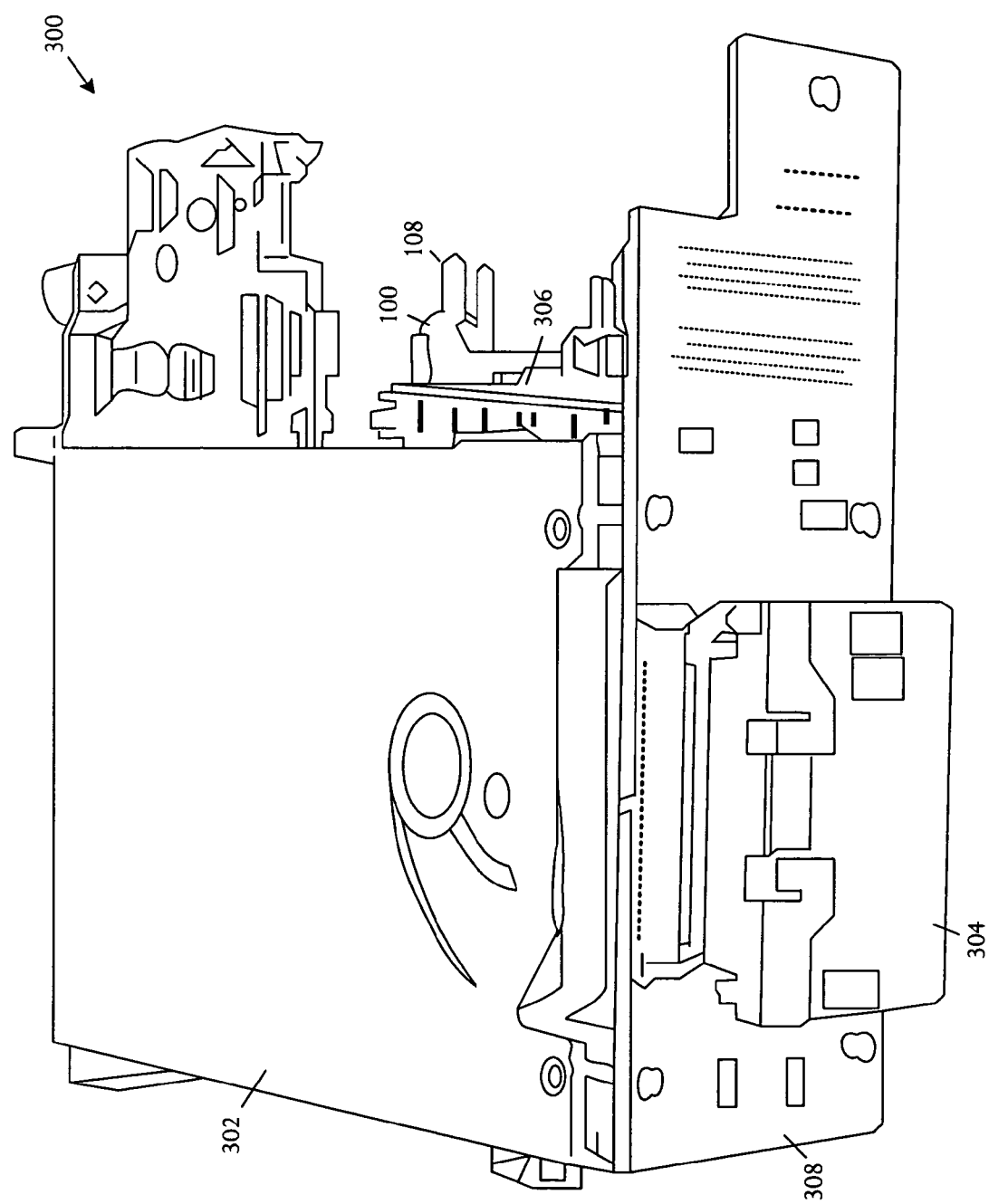
Figure 3D:
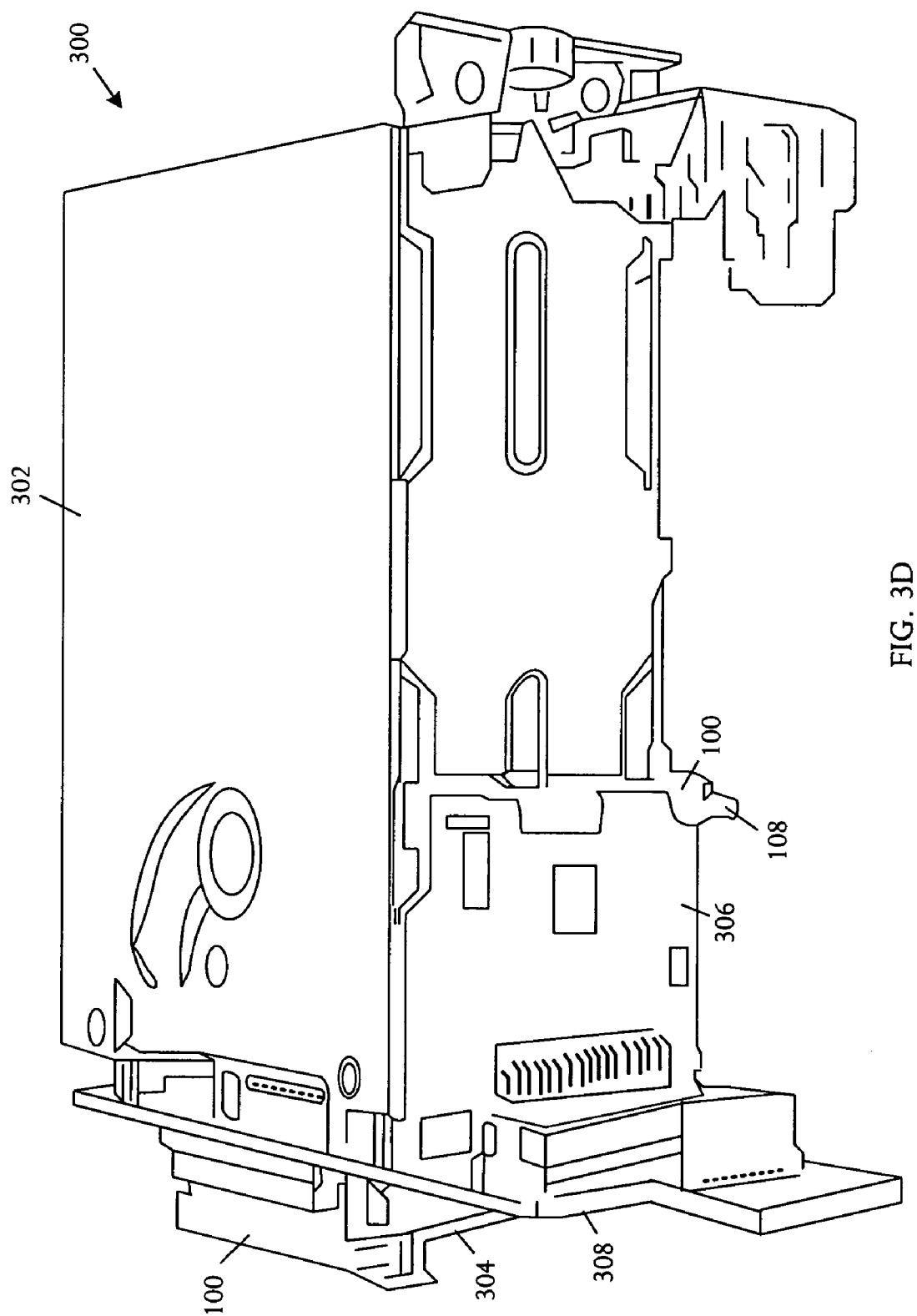
Figure 3F:
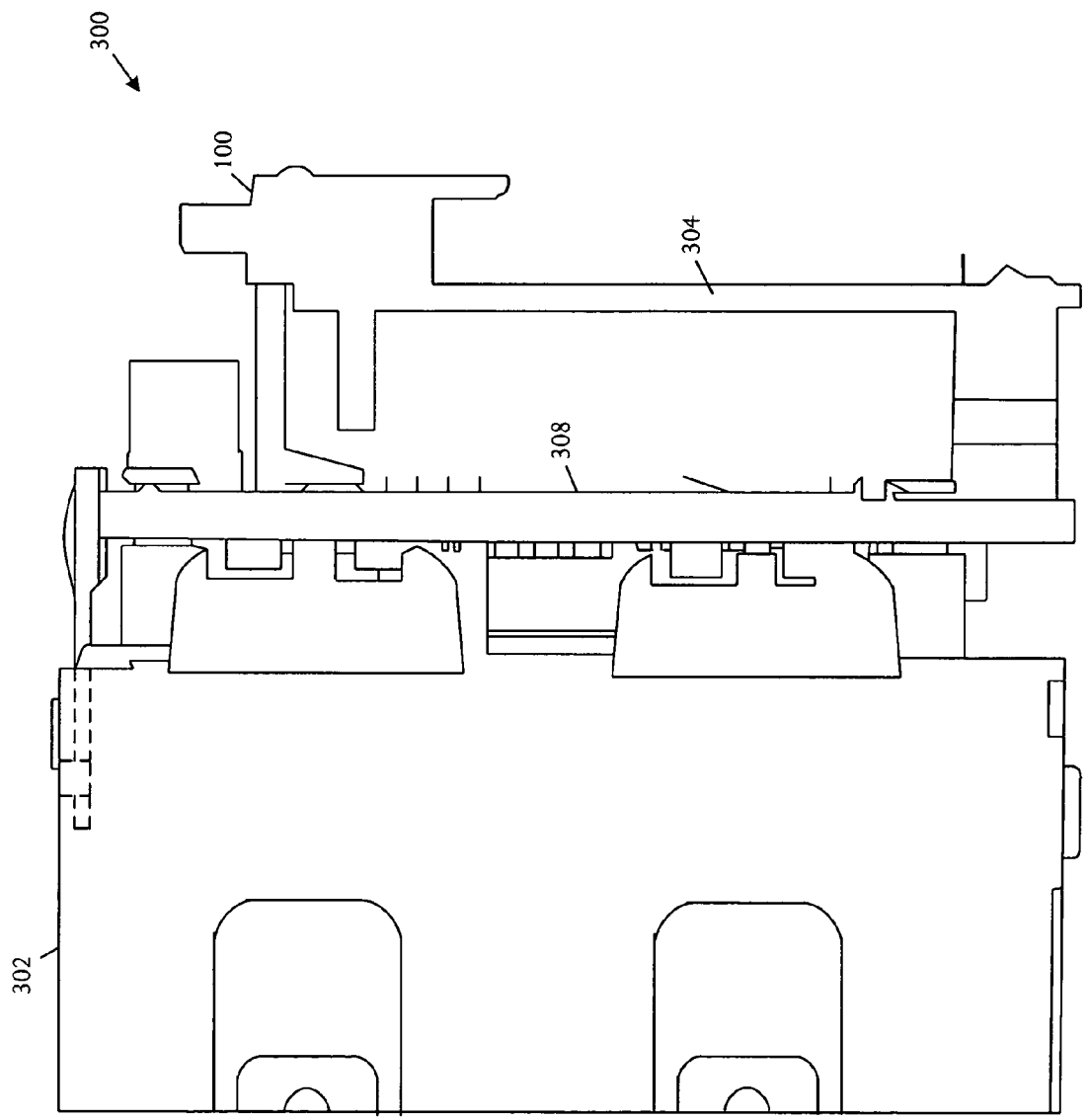

Referring to FIGS. 3A through 3F, various perspective pictorial diagrams depict multiple different views of an embodiment of a hard disk drive assembly 300. FIG. 3A illustrates a perspective view from a right rear angle. FIG. 3B depicts a similar view from a left rear angle. FIG. 3C shows the hard disk drive assembly 300 from a more direct rear view. FIG. 3D illustrates the hard drive 300 in a perspective right side view. FIG. 3E shows the drive assembly 300 from the right front perspective view. FIG. 3F illustrates a left side view of the rear portion of the drive assembly 300. The hard disk drive assembly 300 comprises a hard disk drive housing 302 and first 304 and second 306 printed circuit assemblies of respective first and second types that are coupled to the housing 302. Identical printed circuit assembly carriers 100 are capable of coupling the first and second printed circuit assemblies to the housing. The carriers 100 couple the printed circuit assemblies 304 and 306 of different types to the housing 302 in different orientations via toolless retention features 104 and 108.

In some embodiments, the hard disk drive assembly 300 further comprises a third printed circuit assembly 308 that can be coupled to a side of the hard disk drive housing 302. In the illustrative embodiment, the third printed circuit assembly 308 is substantially planar and has a first planar side that can be coupled to the housing 302 and a second opposing planar side. One of the printed circuit assembly carriers 100 couples the first printed circuit assembly 304 to the second planar side of the third printed circuit assembly 308. Another printed circuit assembly carrier 100 couples the second printed circuit assembly 306 substantially perpendicular to the third printed circuit assembly 308.

In the illustrative hard disk drive assembly 300, the second printed circuit assembly 306 and the second of the printed circuit assembly carriers 100 are implemented for usage of the hard disk drive assembly 300 in a duplex configuration. In the particular illustrative example embodiment, the first printed circuit assembly 304 is a management printed circuit assembly, the second printed circuit assembly 306 is a duplex printed circuit assembly, and the third printed circuit assembly 308 is a hard disk drive printed circuit assembly.

The cable retention feature 120 formed on the carrier 100 is configured to secure the connector of cables, such as SCSI cables routed to the hard disk drive assembly 300. In a particular example, the cable retention feature 120 can be used to secure a main Small Computer Systems Interface (SCSI) cable that is attached to the hard disk drive assembly 300.

Figure 4A:
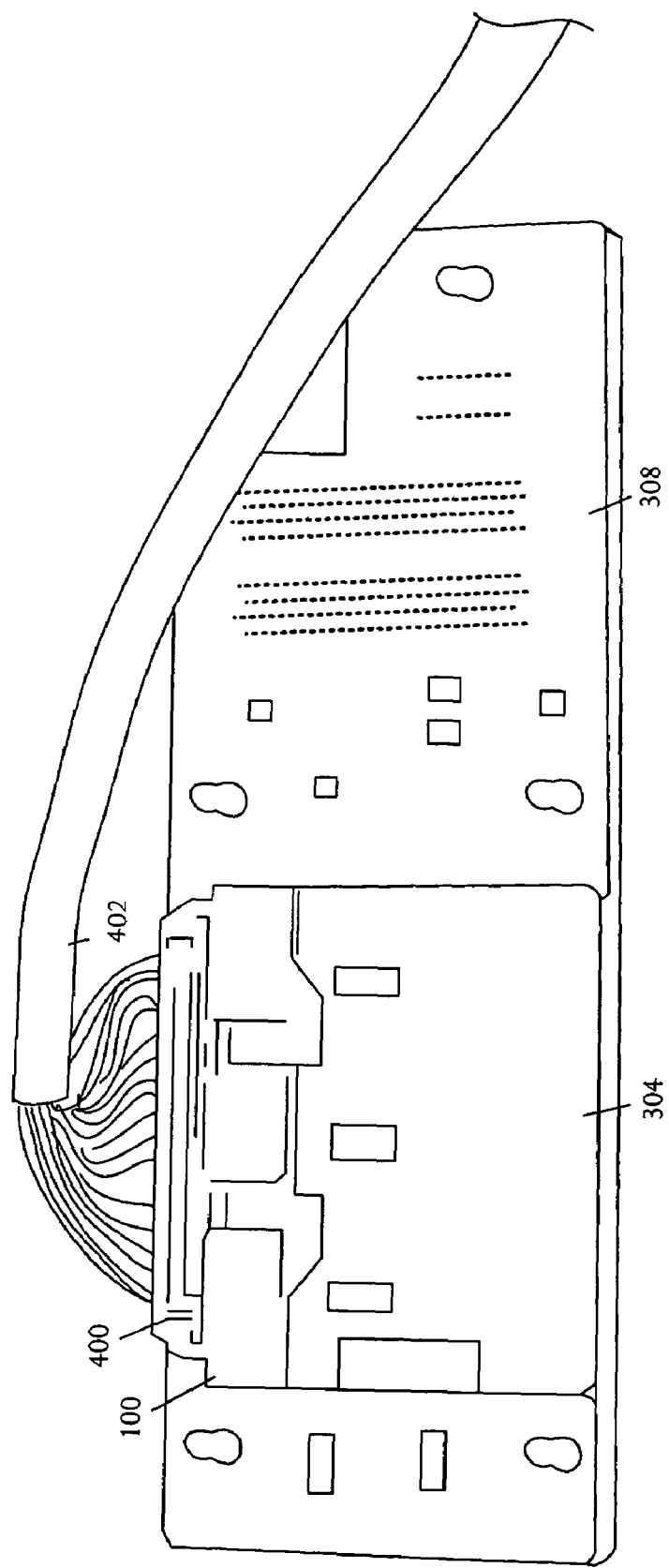
FIGS. 4A and 4B are pictorial diagrams illustrating rear and front views of a printed circuit assembly that can be held using an embodiment of the toolless lock assembly.
Figure 4B:
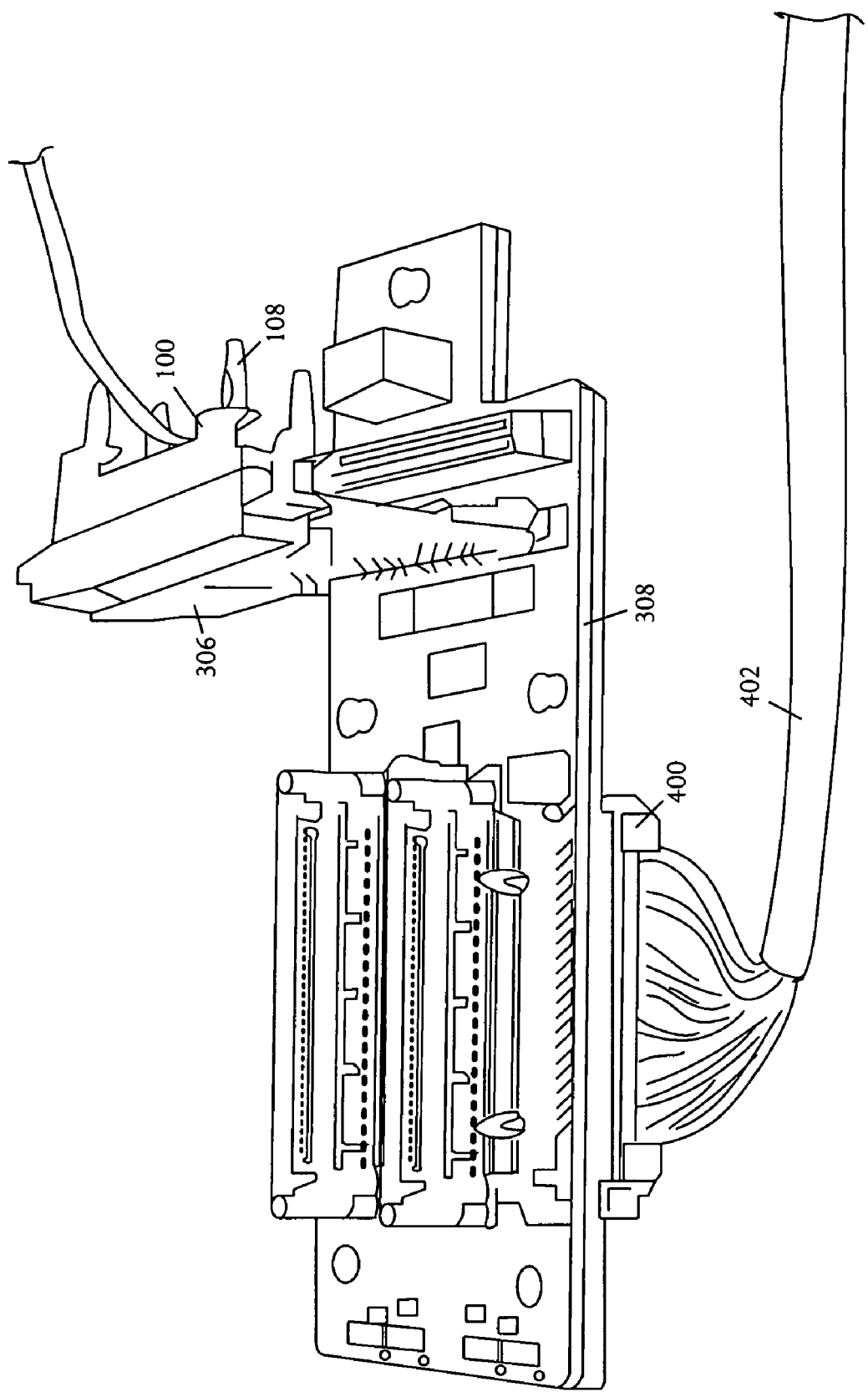

Referring to FIGS. 4A and 4B, pictorial diagrams illustrating rear and front views of a printed circuit assembly 308 that can be held using an embodiment of the toolless PCA carrier 100. The toolless PCA carrier 100 is shown holding the management printed circuit assembly 304 and the duplex printed circuit assembly 306 in combination with the printed circuit assembly 308. Connectors 400 mounted on the printed circuit assembly 308 receive a cable 402 that supplies signal connections to an electronic device.

Figure 5:
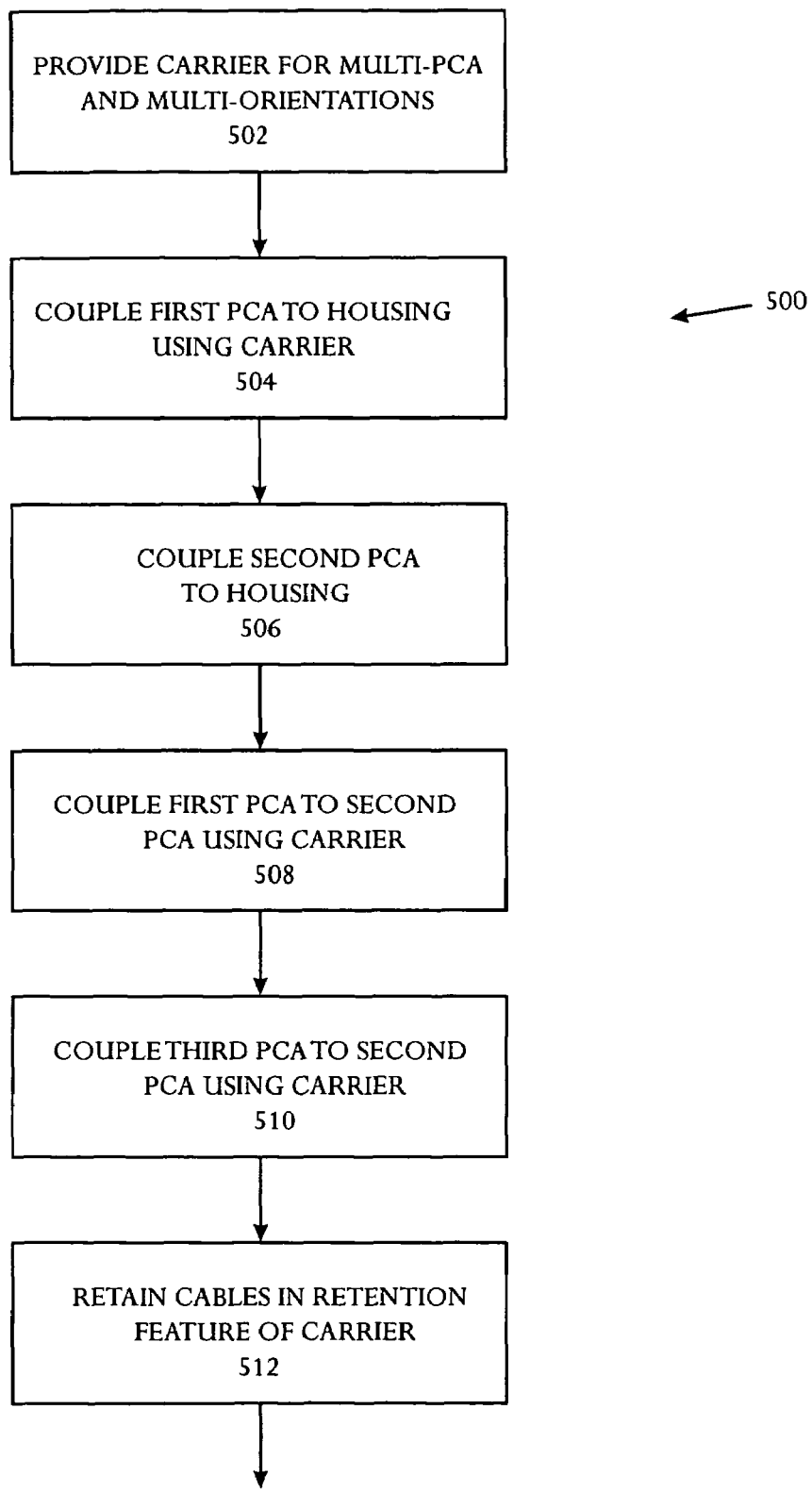
FIG. 5 is a flow chart illustrating a method of assembling or configuring a hard disk drive.

Referring to FIG. 5, a flow chart illustrates a method of assembling or configuring a hard disk drive 500 that comprises providing a carrier 502 that can hold at least two different printed circuit assemblies in at least two different configurations with respect to a hard disk drive housing. The method further includes coupling a first printed circuit assembly to the hard disk drive housing 504 using the carrier. The first printed circuit assembly couples to the housing using toolless retention with the first printed circuit assembly arranged in a first orientation.

The method further comprises coupling a second printed circuit assembly to a surface of the hard disk drive housing 506 and coupling the first printed circuit assembly to the second printed circuit assembly using the carrier 508. The first printed circuit assembly is coupled to the second printed circuit assembly 506 using toolless retention in a first orientation. In an illustrative system, the first printed circuit assembly snaps onto the second printed circuit assembly using snap features that are molded onto the carrier.

In some embodiments, the second printed circuit assembly has an essentially planar structure and the hard disk drive housing has an essentially planar surface for attaching the second printed circuit assembly. In the illustrative embodiment, the second printed circuit assembly attaches to the hard disk drive housing in a toolless manner. For example, the hard disk drive housing can have tabs that extend from the housing and insert into apertures in the second printed circuit assembly. Other embodiments can use other types of toolless interconnections between the second printed circuit assembly and the housing. In still other embodiments, the second printed circuit assembly can attach to the housing using screws or other hardware. The first printed circuit assembly couples to the second printed circuit assembly via toolless retention in a first orientation in which the first printed circuit assembly aligned essentially parallel to the planar surface of the housing and the essentially planar form of the second printed circuit assembly.

In some hard disk drive configurations, the method further comprises the optional action of coupling a third printed circuit assembly to the second printed circuit assembly using a second carrier 510. The third printed circuit assembly can be coupled to the second printed circuit assembly via toolless retention with the third printed circuit assembly and carrier arranged in a second orientation that differs from the orientation of the first printed circuit assembly. In the illustrative hard disk drive assembly, the third printed circuit assembly snaps into the carrier using snap features that are molded into the carrier. The third printed circuit assembly and second printed circuit assembly have connectors that are mated during assembly to secure the assemblies using toolless retention. In a specific embodiment, the third printed circuit assembly can be aligned essentially perpendicular to the second printed circuit assembly.

In some configurations, the method further comprises the optional action of retaining cables 512 that extend between the hard disk drive housing and the first printed circuit card assembly within a cable retention feature of the carrier.

In a specific illustrative embodiment, the first printed circuit assembly may be a manageability printed circuit assembly (PCA) and the second printed circuit assembly a main hard disk drive PCA with the main hard disk drive PCA coupled directly to the hard disk drive housing, chassis, or cage either using toolless connections or via tooled connections using attachment hardware such as screws. The manageability PCA can be oriented in a plane that is essentially parallel to the hard disk drive PCA and attached to the hard disk drive PCA using a carrier and secured using a toolless connection. The third printed circuit assembly can be a duplex PCA oriented essentially perpendicular to the manageability PCA and the hard disk drive PCA, for example mounted adjacent to another side of the hard drive housing. The duplex PCA can be mounted onto a second carrier that separates and insulates the duplex PCA from the hard drive housing. The duplex PCA can be secured to the hard disk drive PCA, for example, by mating connectors.

In an alternative embodiment, functionality of the hard disk drive PCA can be implemented on the manageability PCA and/or the duplex PCA so that the hard disk drive PCA can be omitted. For example, the duplex PCA can be attached to the manageability PCA by toolless coupling using a carrier.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, the specific examples of electronic devices described herein are hard drives or hard disk drives. The disclosed systems, devices, and methods may be used with any suitable electronic devices.

What is claimed is:

1. A printed circuit assembly carrier comprising:
   a carrier frame configured to hold one printed circuit assembly selected from at least two different printed circuit assembly types that respectively mount to a storage drive in at least two different orientations with respect to the storage drive;
   a first toolless retention feature coupled to a first surface of the carrier frame and configured to retain the selected one printed circuit assembly to the carrier frame; and
   a second toolless retention feature coupled to a second surface of the carrier frame and configured to retain the carrier frame to the storage drive, the first and second toolless retention features being mutually configured to hold the at least two different printed circuit assembly types in respective different orientations with respect to the storage drive, wherein:

the carrier frame comprises a first member having parallel opposing planar surfaces including an interior planar surface and an exterior planar surface, the interior planar surface being the first surface coupled to the first toolless retention feature, the exterior planar surface being the second surface coupled to the second toolless retention feature.

2. The carrier according to claim 1 wherein:
the carrier frame and first and second toolless retention features are constructed from molded plastic and configured to selectively support one of two different printed circuit assemblies that install in two different orientations.

3. The carrier according to claim 1 wherein:
the carrier frame comprises a second member coupled at an end of the first member substantially perpendicular to the first member, the second member extending beyond the interior planar surface to the second surface that couples to the second toolless retention feature.

4. The carrier according to claim 1 further comprising:
mounting features coupled to the carrier frame adapted to mount the selected one printed circuit assembly of the at least two different printed circuit assembly types, whereby the at least two different printed circuit assembly types mount to the same features.

5. The carrier according to claim 1 further comprising:
a cable retention feature coupled to the carrier frame.

6. The carrier according to claim 1 wherein:
the storage drive is at least one hard disk drive and the and the carrier frame is configured to hold the at least two different printed circuit assembly types in modes selected from a simplex mode and a duplex mode.

7. An electronic device assembly comprising:
a hard disk drive;
a hard disk drive housing containing the hard disk drive;
a hard disk drive printed circuit assembly coupled to the hard disk drive housing;
a manageability printed circuit assembly;
first and second printed circuit assemblies of respective different first and second types adapted to couple to the housing; and
first and second identical printed circuit assembly carriers adapted to respectively couple the first and second printed circuit assemblies to the housing, the carriers coupling the printed circuit assemblies of different types to the housing in different orientations with respect to the housing via toolless retention features, the first printed circuit assembly carrier coupling the manageability printed circuit assembly to the hard disk drive printed circuit assembly in a first orientation.

8. The electronic device assembly according to claim 7 further comprising:
a third printed circuit assembly configured to couple to a side of the hard disk drive housing.

9. The electronic device assembly according to claim 7 further comprising:
a third printed circuit assembly configured to couple to a side of the hard disk drive housing, the third printed circuit assembly being substantially planar and having a first planar side configured to couple to the hard disk drive housing and a second opposing planar side, wherein
the first identical printed circuit assembly carrier coupling the first printed circuit assembly to the second planar side of the third printed circuit assembly.

10. The electronic device assembly according to claim 7 further comprising:
a third printed circuit assembly adapted to couple to a side of the hard disk drive housing, the third printed circuit assembly being substantially planar and having a first planar side adapted to couple to the hard disk drive housing and a second opposing planar side, wherein
the second identical printed circuit assembly carrier coupling the second printed circuit assembly substantially perpendicular to the third printed circuit assembly.

11. The electronic device assembly according to claim 10 wherein:
the second printed circuit assembly and the second identical printed circuit assembly carrier are implemented for usage of the electronic device assembly in a duplex configuration.

12. The electronic device assembly according to claim 7 further comprising:
a third printed circuit assembly adapted to couple to a side of the hard disk drive housing, wherein:
the electronic device is a hard disk drive;
the hard disk drive housing is a hard disk drive housing, chassis, or cage; and
the first printed circuit assembly is a management printed circuit assembly, the second printed circuit assembly is a duplex printed circuit assembly, and the third printed circuit assembly is a hard disk drive printed circuit assembly.

13. The electronic device assembly according to claim 7 further comprising:
a cable retention feature coupled to the carriers.

14. The assembly according to claim 7 further comprising:
the first and second identical printed circuit assembly carriers configured to secure first and second different printed circuit assembly types;
mounting features coupled to the first and second identical printed circuit assembly carriers configured to mount the first and second different printed circuit assembly types; and
a plurality of toolless retention features coupled to the first and second identical printed circuit assembly carriers and configured to retain the mounted first and second different printed circuit assembly types to the electronic device in respective different orientations.

15. The assembly according to claim 7 further comprising:
a duplex printed circuit assembly; and
the second printed circuit assembly carrier coupling the duplex printed circuit assembly to the hard disk drive housing in a second orientation.

16. An electronic device assembly comprising:
a hard disk drive;
a hard disk drive housing containing the hard disk drive;
first and second printed circuit assemblies of respective different first and second types adapted to couple to the housing;
first and second identical printed circuit assembly carriers adapted to respectively couple the first and second printed circuit assemblies to the housing, the carriers coupling the printed circuit assemblies of different types to the housing in different orientations with respect to the housing via toolless retention features;
a planar hard disk drive printed circuit assembly having a front side and a rear side, the front side being coupled to the hard disk drive housing;

a manageability printed circuit assembly; and the first printed circuit assembly carrier coupling the manageability printed circuit assembly to the rear side of the hard disk drive printed circuit assembly in a first orientation parallel to the hard disk drive printed circuit assembly.

17. The assembly according to claim 16 further comprising:

a duplex printed circuit assembly; and the second printed circuit assembly carrier coupling the duplex printed circuit assembly to the hard disk drive housing in a second orientation perpendicular to the hard disk drive printed circuit assembly front side whereby the duplex printed circuit assembly attaches to the hard disk drive printed circuit assembly front side.

18. The assembly according to claim 17 wherein:

the second printed circuit assembly carrier couples the duplex printed circuit assembly to the hard disk drive housing in physical separation from the hard disk drive housing wherein physical contact is prevented.

* * * * *

UNITED STATES PATENT AND TRADEMARK OFFICE
CERTIFICATE OF CORRECTION

| | |
|---|---|
| PATENT NO. | : 7,184,270 B2 |
| APPLICATION NO. | : 10/721627 |
| DATED | : February 27, 2007 |
| INVENTOR(S) | : Michael Y. Suekawa et al. |

Page 1 of 1

It is certified that error appears in the above-identified patent and that said Letters Patent is hereby corrected as shown below:

In column 7, line 30, in Claim 6, after "disk drive" delete "and the".

Signed and Sealed this

Fifteenth Day of September, 2009

David J. Kappos
*Director of the United States Patent and Trademark Office*